US00RE47304E

(19) United States
(12) Reissued Patent
Conners et al.

(10) Patent Number: US RE47,304 E
(45) Date of Reissued Patent: Mar. 19, 2019

(54) NOZZLE ARRANGEMENT AND METHOD OF MAKING THE SAME

(71) Applicant: Gulfstream Aerospace Corporation, Savannah, GA (US)

(72) Inventors: Timothy R. Conners, Tucson, AZ (US); Preston A. Henne, Savannah, GA (US); Donald C. Howe, Savannah, GA (US)

(73) Assignee: Gulfstream Aerospace Corporation, Savannah, GA (US)

(21) Appl. No.: 15/693,226

(22) Filed: Aug. 31, 2017

Related U.S. Patent Documents

Reissue of:
(64) Patent No.: 9,121,369
Issued: Sep. 1, 2015
Appl. No.: 13/541,495
Filed: Jul. 3, 2012

U.S. Applications:
(60) Provisional application No. 61/525,604, filed on Aug. 19, 2011.

(51) Int. Cl.
*F02K 1/46* (2006.01)
*F02K 1/04* (2006.01)
(Continued)

(52) U.S. Cl.
CPC ..... *F02K 1/46* (2013.01); *B64D 33/02* (2013.01); *F02C 7/04* (2013.01); *F02K 1/04* (2013.01); *F02K 3/02* (2013.01)

(58) Field of Classification Search
None
See application file for complete search history.

(56) References Cited

U.S. PATENT DOCUMENTS 2,683,962 A * 7/1954 Griffith ..... D01D 5/06 239/265.11
3,077,735 A 2/1963 Johnson et al.
(Continued)

FOREIGN PATENT DOCUMENTS

CA 2851228 * 4/2016
CN 101384486 A 3/2009
(Continued)

OTHER PUBLICATIONS

Martin, et al., "A Study of the Aerodynamics of a Supersonic Intake Compression Surface with Perforated Bleed Using CFD Methods," March 2007, Group for Aeronautical Research and Technology in Europe (Garteur), p. 19.

(Continued)

*Primary Examiner* — Glenn K Dawson
(74) *Attorney, Agent, or Firm* — LKGlobal | Lorenz & Kopf, LLP

(57) ABSTRACT

A nozzle arrangement is disclosed herein for use with a supersonic jet engine that is configured to produce a plume of exhaust gases. The nozzle arrangement includes, but is not limited to, a nozzle having a trailing edge and a plug body partially positioned within the nozzle. The plug body has an expansion surface and a compression surface downstream of the expansion surface. A protruding portion of the plug body extends downstream of the trailing edge for a length greater than a conventional plug body length. The plug body is configured to shape the exhaust gases to flow substantially parallel to a free stream of air flowing off of the trailing edge of the nozzle and to cause the plume of exhaust
(Continued)

gases to isentropically turn the free stream of air to move in a direction parallel to a longitudinal axis of the plug body.

19 Claims, 10 Drawing Sheets

(51) Int. Cl.

| | |
|---|---|
| ***B64D 33/02*** | (2006.01) |
| ***F02K 3/02*** | (2006.01) |
| ***F02C 7/04*** | (2006.01) |

(56) References Cited

U.S. PATENT DOCUMENTS

| | | | | |
|---|---|---|---|---|
| 3,495,605 | A | 2/1970 | Gunnarson et al. | |
| 4,007,891 | A | 2/1977 | Sorensen et al. | |
| 4,501,393 | A * | 2/1985 | Klees | F02K 1/625 181/215 |
| 5,216,878 | A * | 6/1993 | Klees | F02C 7/042 60/204 |
| 5,220,787 | A | 6/1993 | Bulman | |
| 5,222,359 | A * | 6/1993 | Klees | F02C 7/04 60/204 |
| 5,463,866 | A * | 11/1995 | Klees | F02K 1/383 239/265.17 |
| 8,393,158 | B2 * | 3/2013 | Conners | B64D 33/02 137/15.1 |
| 8,739,514 | B2 * | 6/2014 | Conners | B64D 33/02 137/15.1 |
| 9,121,369 | B2 * | 9/2015 | Conners | F02K 1/04 |
| 9,353,704 | B2 * | 5/2016 | Conners | B64D 33/02 |
| 2006/0016171 | A1 | 1/2006 | Renggli | |
| 2008/0061559 | A1 | 3/2008 | Hirshberg | |
| 2008/0069687 | A1 | 3/2008 | Lace | |
| 2008/0271787 | A1 | 11/2008 | Henne et al. | |
| 2009/0090654 | A1 * | 4/2009 | Duyvesteyn | B01F 5/0256 208/106 |
| 2009/0107557 | A1 | 4/2009 | Conners | |
| 2010/0043389 | A1 | 2/2010 | Conners | |
| 2010/0139284 | A1 | 6/2010 | Chase et al. | |
| 2011/0062290 | A1 | 3/2011 | Chase et al. | |

FOREIGN PATENT DOCUMENTS

| | | | |
|---|---|---|---|
| DE | 1751698 | U | 9/1957 |
| DE | 977380 | C | 4/1966 |
| JP | 2001140697 | A | 5/2001 |
| JP | 2002226907 | A | 8/2002 |
| JP | 2003294504 | A | 10/2003 |
| WO | WO 2009055041 | A2 * | 4/2009 |
| WO | 2013062664 | * | 5/2013 |

OTHER PUBLICATIONS

Search Report/written Opinion dated April 26, 2013 in PCT/US12/51458.

Search Report/written Opinion dated January 23, 2013 in PCT/US12/51455.

State Intellectual Property Office of the People's Republic of China, Office Action in Chinese Patent Application No. 201280051783.5 dated July 2, 2015.

State Intellectual Property Office of the People's Republic of China, Office Action in Chinese Patent Application No. 201280051783.5 Filed November 17, 2015.

The International Bureau of WIPO, International Preliminary Report on Patentability for International Application No. PCT/US2012/051458, dated April 10, 2014.

The International Bureau of WIPO, International Preliminary Report on Patentability for International Application No. PCT/US2012/051455, dated March 6, 2014.

USPTO, Final Office Action for U.S. Appl. No. 13/541,495, dated July 11, 2014.

USPTO, Final Office Action for U.S. Appl. No. 13/541,482, dated July 7, 2014.

USPTO, Notice of Allowance and Fee(s) Due for U.S. Appl. No. 13/541,495, dated Jan. 15, 2015.

USPTO, Notice of Allowance and Fee(s) Due for U.S. Appl. No. 13/541,482, dated Sep. 2, 2015.

USPTO, Office Action for U.S. Appl. No. 13/541,482, dated Jan. 16, 2015.

USPTO, Office Action for U.S. Appl. No. 13/541,482, dated Nov. 27, 2013.

USPTO, Office Action for U.S. Appl. No. 13/541,495, dated Dec. 6, 2013.

USPTO, Response to Final Office Action for U.S. Appl. No. 13/541,495, dated Dec. 8, 2014.

USPTO, Response to Final Office Action for U.S. Appl. No. 13/541,482, dated Dec. 2, 2014.

USPTO, Response to Office Action for U.S. Appl. No. 13/541,482, dated Mar. 5, 2014.

Canadian Intellectual Property Office, Notice of Allowance for Canadian Application 2,851,228 dated Oct. 5, 2015.

Canadian Intellectual Property Office, Office Action for Canadian Application 2,851,228 dated Jun. 1, 2015.

Canadian Intellectual Property Office, Response to Office Action for Canadian Application 2,851,228 Filed Sep. 16, 2015.

European Patent Office, Amendment in Response to European Supplementary Search Report for European Patent Application 12825921.5 Filed Oct. 15, 2015.

European Patent Office, Communication Pursuant to Rules 70(2) and 70A(2) EPC, in Application 12844128.4 dated May 18, 2015.

European Patent Office, European Supplementary Search Report for European Patent Application 12825921.5 dated Mar. 31, 2015.

European Patent Office, Supplemental European Search Report, in Application 12844128.4 dated Apr. 29, 2015.

Japan Patent Office, Notice of Reasons for Rejection for Application 2014-527208 dated Aug. 4, 2015.

Seltzman,"Rocket Nozzle Thrust", 2001, Georgia Tech, p. 3.*

Tapee, "Experimental Aerodynamic Analysis of a Plug Nozzle for Supersonic Business Jet Application" Aug. 2009, Purdue University, p. 2-3.*

* cited by examiner

NOZZLE ARRANGEMENT AND METHOD OF MAKING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application *is a reissue application of U.S. patent application Ser. No. 13/541,495, filed 3 Jul. 2012 (now U.S. Pat. No. 9,121,369), which* claims priority to previously filed U.S. Provisional Patent Application 61/525,604, filed Aug. 19, 2011, and entitled "Shaped Streamtube Nacelle For Reduced Sonic Boom Strength" which is hereby incorporated herein by reference in its entirety.

TECHNICAL FIELD

The present invention generally relates to aircraft and more particularly relates to nozzle arrangements and methods of making nozzle arrangements for use with supersonic jet engines.

BACKGROUND

Acoustic disturbances produced at supersonic flight speed by a propulsion system's nacelle cowling surface, along with those from the aerodynamic boundary surfaces of the inlet's captured stream tube and the jet plume exhaust from the nozzle, all influence the perceived loudness of an aircraft's sonic boom. A traditionally-designed nacelle produces numerous shocks that ultimately coalesce into the vehicle's overall sonic boom footprint. The challenge in attenuating the strength of these shock features lays in the inherent difficulty of rerouting flow streamlines in a supersonic flowfield without producing a discrete disturbance.

Spillage is an inlet characteristic that contributes strongly to sonic boom strength. Spillage is excess flow that is unusable by the propulsion system and naturally diverted ('spilled') around the sides of the intake through the inlet compression field. In a typical design, spillage occurs through the terminal shock, the only physical mechanism that can do so in a typical inlet design. The more spillage required, due for instance to off-design engine operation, the stronger the inlet's terminal shock automatically becomes, and the more detrimental the influence on sonic boom. Because it is a shock, this feature is discrete, overlaying an impulse into the vehicle's acoustic field. And because of its discrete nature, an impulse feature is difficult to attenuate or cancel using other low sonic-boom design techniques.

The angling of the cowling surface in the stream-wise direction at both the intake and nozzle exit contribute to sonic boom strength as does cowl blistering or bulging used to fit the nacelle around engine protuberances such as a gearbox. Intake cowl angle and nacelle bulging create blockage features to oncoming supersonic flow that generate compression shocks. In addition, the cowling angle at the nozzle exit, along with the downstream surfaces of any cowl bulging, produce expansion fans that tend to readapt to the local flowfield through compression shocks.

Finally, in a typical design, the exhaust jet plume itself aggravates the local acoustic field by generating strong compression shock and expansion-reshock features along its shear surface through flow-angle mismatch with the nacelle cowling and mal-adaption of the exhaust outflow pressure to the exit area of the nozzle. Off-design engine operation further aggravates this flow-angle and pressure mismatch. These issues are illustrated in FIGS. 1-3 which depict a conventional supersonic jet engine.

FIG. 1 schematically illustrates a prior art supersonic jet engine 20 having an inlet arrangement 22 and a nozzle arrangement 24 configured for operation at a predetermined Mach speed. Inlet arrangement 22 includes a cowl 26 and a center body 28. Center body 28 is coaxially aligned with cowl 26. Cowl 26 includes a cowl lip 30 and center body 28 includes a compression surface 32 and an apex 34 (also referred to as a "leading edge"). Cowl lip 30 and compression surface 32 together define an inlet 36 which admits air to turbo machinery 38.

A protruding portion 38 (also known as a "spike") of center body 28 extends forward of cowl lip 30 by a distance $L_1$. A supersonic airflow (not shown) approaching prior art supersonic jet engine 20 will encounter protruding portion 38 prior to entering inlet 36. The supersonic flow will initially encounter apex 34 resulting in an initial shock (not shown) that will extend in a rearward direction at an oblique angle that corresponds to, among other factors, the Mach speed at which prior art supersonic jet engine 20 is traveling. Conventionally, it is desirable to give protruding portion 38 a length that will result in an initial shock that extends from apex 34 to cowl lip 30 when the aircraft is moving at a predetermined Mach speed (also known as a "design speed" or a "cruise speed"). The length of a protruding portion that causes the initial shock to extend from apex 34 to cowl lip 30 when the aircraft is moving at the predetermined Mach speed will be referred to herein as a "conventional spike length".

Nozzle arrangement 24 includes a nozzle 40 having a trailing edge 42. Nozzle arrangement 24 further includes a plug body 44 having a surface. Trailing edge 42 and surface 46 define an outlet 48. Plug body 44 is configured to control the expansion of the exhaust gases (referred to herein as the "exhaust plume") exhausted from turbo machinery 38 during operation of prior art supersonic jet engine 20. As the exhaust plume travels downstream along plug body 44, plug body 44 has a continually decreasing diameter which provides space to accommodate the expanding gases of the exhaust plume. The ability of plug body 44 to control the expansion of exhaust gases of the exhaust plume ends at a trailing end 50 of plug body 44. At a point downstream of trailing end 50, the exhaust gasses of the exhaust plume will become fully expanded.

As illustrated in FIG. 1, a protruding portion 52 of plug body 44 extends beyond trailing edge 42 of cowl 40 by a distance $L_2$. As is known in the art, the length $L_2$ is selected by engine designers to correspond with a point of intersection of Mach lines propagating off an internal surface of trailing edge 42 when the prior art supersonic jet engine 20 is operated at a power setting that corresponds with the predetermined Mach number. The length of a protruding portion that corresponds with the intersection point of the Mach lines propagating off of an internal surface of trailing edge 42 will be referred to herein as a "conventional plug body length".

FIG. 2 illustrates a prior art supersonic jet engine 20 traveling at the predetermined Mach speed. As prior art supersonic jet engine 20 travels down range, a free stream 52 of air approaches protruding portion 38. A portion of free stream 52 has been illustrated in phantom lines as forming a stream tube 54. Stream tube 54 has a diameter that corresponds with a diameter at cowl lip 30 and has a length that corresponds with a discrete period of time of operation of turbo machinery 38. All of the air within stream tube 54 will have some interaction with inlet arrangement 22—a portion of air within stream tube 54 will enter inlet 36 and the remaining portion of air will be spilled out of inlet 36.

Interaction between free stream 52 and apex 34 gives rise to initial shock 56. Interaction of free stream 52 with cowl lip 30 gives rise to a terminal shock 58 that propagates inwardly towards compression surface 32. Interaction of free stream 52 with cowl lip 30 also gives rise to a cowl shock 60 that propagates outwardly from prior art supersonic jet engine 20. The strength of cowl shock 60 corresponds, in part, with the angle at which cowl lip 30 is canted with respect to the horizon. The greater the angle, the stronger will be cowl shock 60.

Prior art supersonic jet engine 20 is configured to consume air at a predetermined mass flow rate while traveling down range at the predetermined Mach speed. As supersonic jet engine 20 moves down range, it will consume a smaller volume of air than is available in stream tube 54. Accordingly, a portion of the air within stream tube 54 will enter inlet 36 and a portion of the air within stream tube 54 will be spilled ("excess air"). The excess air within stream tube 54 must move in a direction that is radially outward with respect to inlet 36 in order to spill. However, the excess air cannot move out of the way of the approaching inlet 36 until after the excess air has passed through terminal shock 58. This is because the pressure disturbances arising out of the movement of the jet engine through the air towards stream tube 54 move only at the speed of sound while the jet engine approaches stream tube 54 at speeds in excess of the speed of sound. Thus, the first opportunity for the excess air to move out of the way of inlet 36 does not occur until after the excess air has passed through terminal shock 58. This phenomenon is illustrated in FIG. 3

FIG. 3 illustrates an outer layer 62 of stream tube 54 as it approaches inlet 36. Outer layer 62 represents the excess air, i.e., the portion of stream tube 54 that will not be consumed by turbo machinery 38 (See FIG. 2) and therefore will not enter inlet 36. Once outer layer 62 passes through terminal shock 58, it encounters the pressure disturbances associated with movement of prior art jet engine 20 through free stream 52. Outer layer 62 is then pushed laterally aside and overflows around cowl lip 30 as illustrated. This spilling of outer layer 62 out of the path of inlet 36 and around cowl lip 30 causes cowl shock 60 to move forward of cowl lip 30, thereby increasing its strength. The stronger this shock is, the greater will be the noise disturbance associated with it.

Returning to FIG. 2, an exhaust plume 63 is emitted from outlet 48. In the illustrated example, exhaust plume 63 comprises a straight cylinder of exhaust gas moving downstream away from nozzle arrangement 24. A free stream of air 64 approaching trailing edge 42 of nozzle 40 is traveling at an angle with respect to the straight cylinder formed by exhaust plume 63. As free stream of air 64 passes trailing edge 42 and encounters exhaust plume 63, the shear layer created by exhaust plume 63 behaves like a solid surface and causes free stream of air 64 to abruptly change direction. This abrupt change of direction gives rise to a tail shock 66. The encounter between free stream of air 64 and exhaust plume 63 may cause the gases of exhaust plume 63 to also abruptly change direction, causing the plume to generate additional shocks downstream (not shown) The strength of tail shock 66 (and the additional shocks in the plume) will depend upon the amount of misalignment between free stream 64 and exhaust plume 63.

As exhaust plume 63 passes downstream of trailing end 50, exhaust plume 63 will quickly reach a fully expanded condition. Starting from the point where exhaust plume 63 is fully expanded and moving downstream, exhaust plume 63 and free stream 64 will flow parallel to one another and both will flow in a direction that is parallel to a longitudinal axis of plug body 44. The transitional region, which starts where free stream 64 initially encounters exhaust plume 63 and which ends where exhaust plume 63 and free stream 64 flow parallel to a longitudinal axis of plug body 44, can give rise to expansions and compressions that, due to their proximity to tail shock 66, may contribute to the perceived loudness of sonic boom resulting from movement of prior art supersonic jet engine 20 at the predetermined Mach speed.

Accordingly, it is desirable to provide an inlet arrangement that is configured to mitigate the concerns described above. In addition, it is desirable to provide a method for assembling such an inlet arrangement. Furthermore, other desirable features and characteristics will become apparent from the subsequent summary and detailed description and the appended claims, taken in conjunction with the accompanying drawings and the foregoing technical field and background.

BRIEF SUMMARY

A nozzle arrangement and a method of making a nozzle arrangement for use with a supersonic jet engine configured to provide a plume of exhaust gases when the engine is operating at a predetermined power setting and moving at a predetermined Mach speed is disclosed herein.

In a first, non-limiting embodiment, the nozzle arrangement includes, but is not limited to a nozzle that is configured to exhaust the plume of exhaust gases. The nozzle has a trailing edge that is oriented at a predetermined angle with respect to an axial direction of the nozzle. The nozzle arrangement further includes a plug body that is partially positioned within the nozzle and that is coaxially aligned with the nozzle. The plug body has an expansion surface and a compression surface downstream of the expansion surface. A protruding portion of the plug body extends downstream of the trailing edge for a length greater than a conventional plug body length. The protruding portion of the plug body has a substantially circular cross section along substantially an entire longitudinal length of the protruding portion of the plug body. The plug body is configured to shape the plume of exhaust gases such that the plume of exhaust gases flows substantially parallel to a direction of a free stream of air flowing off of the trailing edge of the nozzle proximate the trailing edge of the nozzle and further configured to cause the plume of exhaust gases to isentropically turn the free stream of air flowing off of the trailing edge of the nozzle at a location downstream of the trailing edge of the nozzle such that the free stream of air flowing off of the trailing edge moves in a direction parallel to a longitudinal axis of the plug body.

In another non-limiting embodiment, the nozzle arrangement includes, but is not limited to, a nozzle that is configured to produce the plume of exhaust gases. The nozzle has a trailing edge that is oriented at a predetermined angle with respect to an axial direction of the nozzle. The nozzle arrangement further includes a plug body that is partially positioned within the nozzle and coaxially aligned with the nozzle. The nozzle arrangement further includes, but is not limited to, a bypass wall disposed between the nozzle and the plug configured to direct a bypass airflow out of the nozzle. The plug body has an expansion surface and a compression surface downstream of the expansion surface. A protruding portion of the plug body extends downstream of the trailing edge for a length greater than a conventional plug body length. The protruding portion of the plug body has a substantially circular cross section along substantially an entire longitudinal length of the protruding portion of the plug body. The plug body is configured to shape the plume of exhaust gases and the bypass airflow such that the plume of exhaust gases and the bypass air flow substantially parallel to a direction of a free stream of air flowing off of the trailing edge of the nozzle proximate the trailing edge of the nozzle and further configured to cause the plume of exhaust gases and the bypass airflow to isentropically turn the free stream of air flowing off of the trailing edge of the nozzle at a location downstream of the trailing edge of the nozzle such that the free stream of air flowing off of the trailing edge moves in a direction parallel to a longitudinal axis of the plug body.

In a third non-limiting embodiment, the method includes, but is not limited to the step of providing a nozzle and a plug body. The nozzle is configured to exhaust the plume of exhaust gases. The nozzle has a trailing edge that is oriented at a predetermined angle with respect to an axial direction of the nozzle. The plug body has an expansion surface and a compression surface downstream of the expansion surface. The method further includes, but is not limited to, positioning the plug body with respect to the nozzle such that the plug body is partially positioned within the nozzle and coaxially aligned therewith and such that a protruding portion of the plug body extends downstream of the trailing edge for a length greater than a conventional plug body length. The protruding portion of the plug body has a substantially circular cross-section along substantially an entire longitudinal length of the protruding portion of the plug body. The plug body is configured to shape the plume of exhaust gases such that the plume of exhaust gases flows substantially parallel to direction of the free stream of air flowing off of the trailing edge of the nozzle proximate the trailing edge of the nozzle. The plug body is further configured to cause the plume of exhaust gases to isentropically turn the free stream of air flowing off of the trailing edge of the nozzle at a location downstream of the trailing edge of the nozzle such that the free stream of air flowing off of the trailing edge moves in a direction parallel to a longitudinal axis of the plug body.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
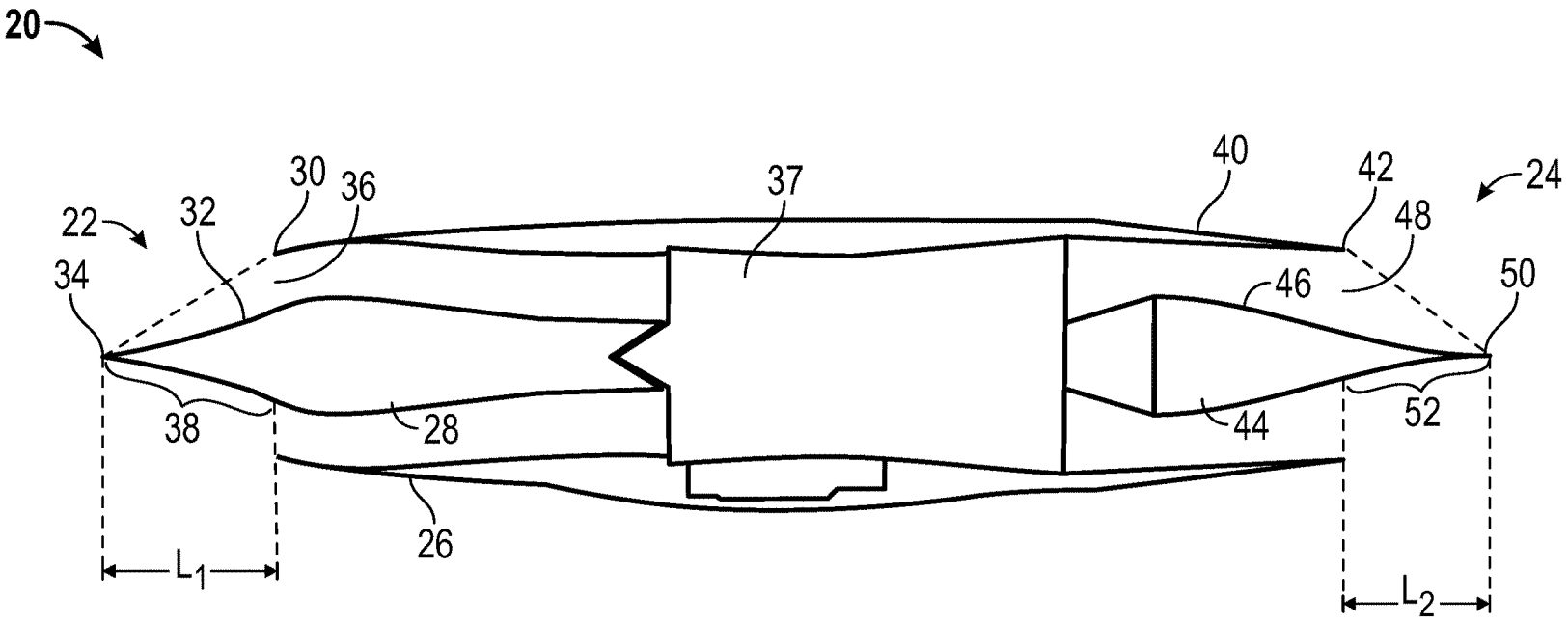
FIG. 1 (Prior Art)
FIG. 1 is a schematic view illustrating a prior art jet engine.
Figure 2:
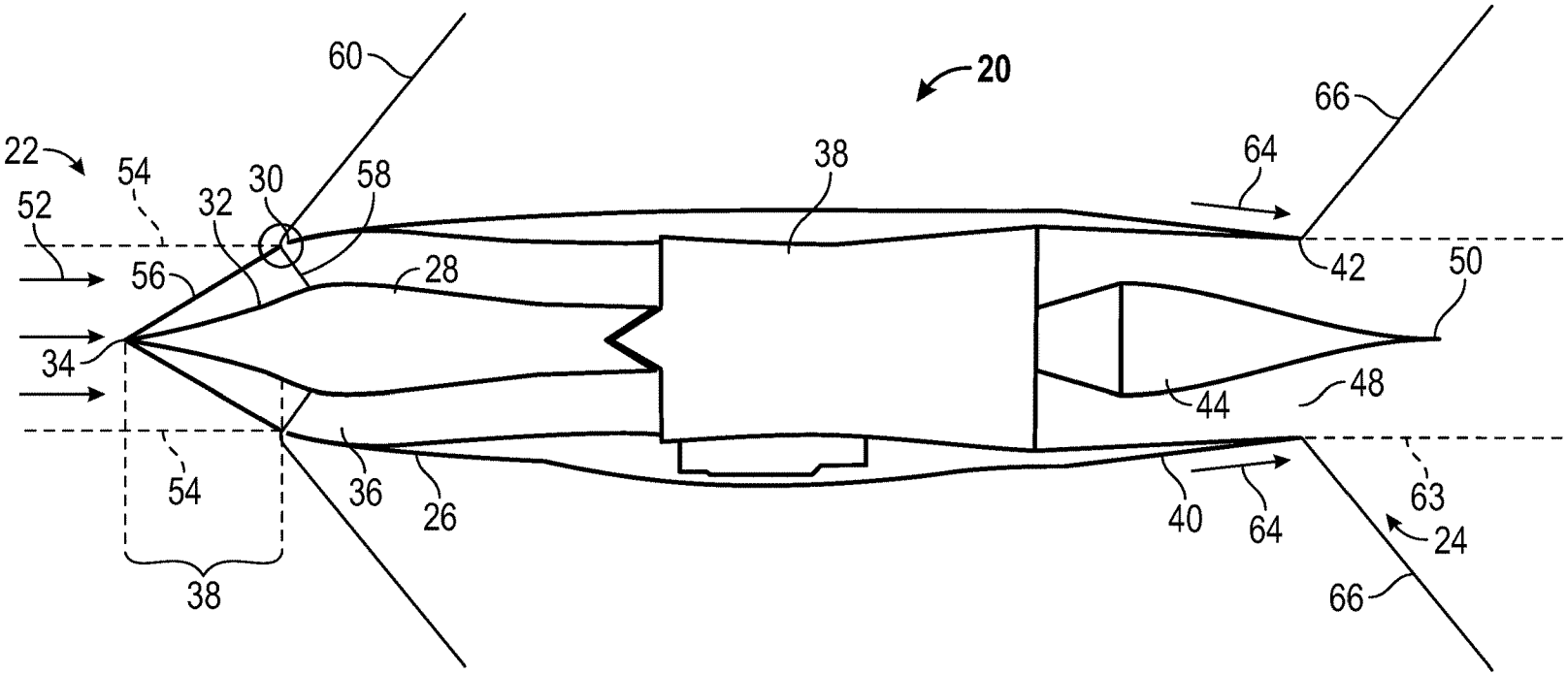
FIG. 2 (Prior Art)
FIG. 2 is a schematic view illustrating the prior art jet engine of FIG. 1 moving through a free stream at a predetermined Mach number.
Figure 3:
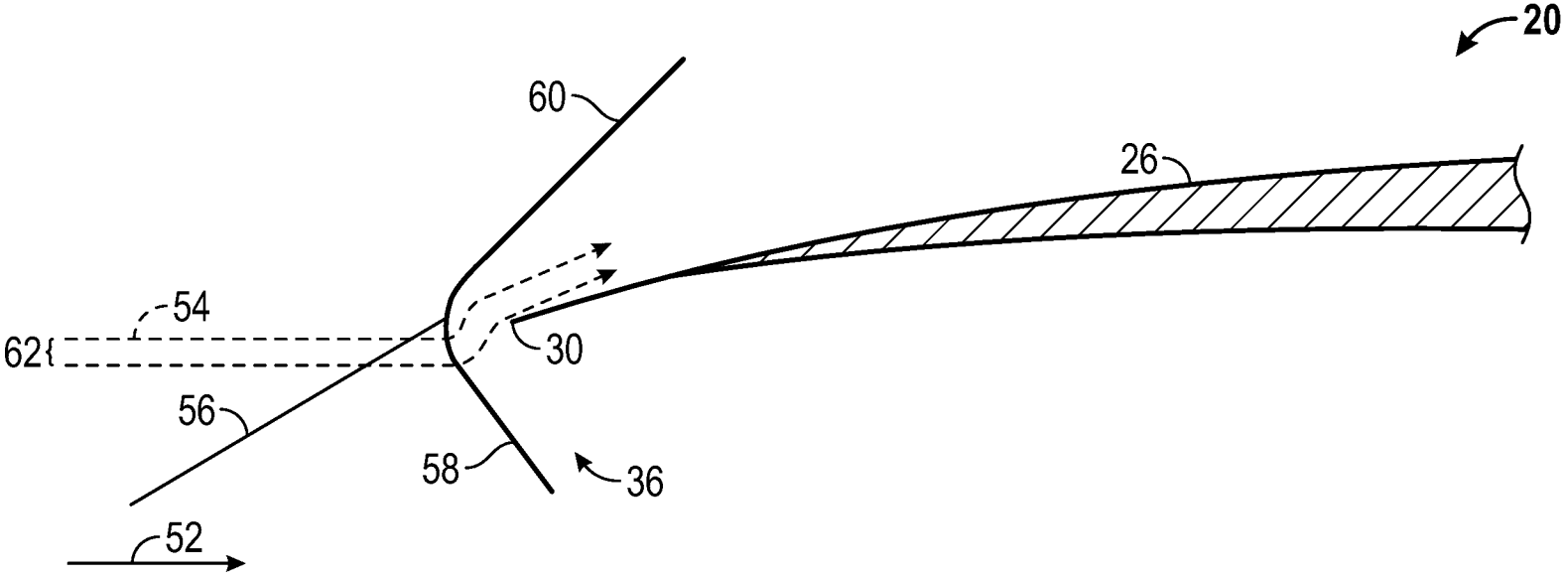
FIG. 3 (Prior Art)
FIG. 3 is an expanded view of a portion of the prior art jet engine of FIG. 2 illustrating the spillage of air around a cowl lip of an inlet.

An inlet arrangement is disclosed herein that substantially eliminates the spillage of excess air from a stream tube when the stream tube encounters a supersonic jet engine inlet moving at supersonic speeds. In an embodiment, the inlet arrangement includes a lengthened center body having an extended protruding portion that pre-spills the air from the stream tube before the stream tube encounters the inlet and/or the terminal shock. The length of the center body is increased such that length $L_1$ (see FIG. 1) exceeds a conventional spike length. In addition, the protruding portion has contours and is dimensioned so as to cause substantially all of the excess air to be pushed out of the path of the approaching inlet as the stream tube passes over the protruding portion. As a result, the air of the stream tube that remains in the path of the inlet will have a mass flow rate that matches the consumption rate of the turbo machinery of the jet engine when the jet engine is moving at a predetermined Mach speed and operating at a predetermined power setting. This substantially eliminates spillage at the inlet and permits the cowl shock to rest substantially directly on the cowl lip. This greatly diminishes the strength of the cowl shock and, as a result, diminishes the perceived noise associated with the cowl shock.

Additionally, in accordance with at least one embodiment, the inlet arrangement disclosed herein permits the cowl to have a substantially lower cowl angle as compared with conventional inlet arrangements. Although lowering the cowl angle will cause the inlet to have a larger diameter, by dimensioning and configuring the protruding portion appropriately, the stream tube approaching the inlet can be lofted to whatever height is necessary to meet the increased diameter of the inlet. Furthermore, because of the extended length of the protruding portion, the stream tube approaching the inlet can not only be lofted, but can also be turned to align more closely with a longitudinal axis of the center body to more closely align with the lower cowl angle. The reduced cowl angle will further diminish the strength of the cowl shock and, in turn, reduce the perceived noise associated with the cowl shock.

A nozzle arrangement is disclosed herein that substantially eliminates the misalignment between the free stream of air flowing past the trailing edge of the nozzle and the exhaust plume. In accordance with one embodiment, the nozzle arrangement includes a lengthened plug body having an extended protruding portion such that the length $L_2$ (see FIG. 1) exceeds the conventional plug body length. Furthermore, the plug body *has an isentropic compression surface and* is configured to cause the exhaust plume to exit the nozzle in a direction that is substantially aligned with the direction of the free stream of air flowing past the trailing edge of the nozzle. Such alignment will reduce or eliminate the shock that would otherwise form from a sudden change in direction of the free stream when encountering a misaligned exhaust plume.

Furthermore, in accordance with a further embodiment, by lengthening $L_2$, the full expansion of exhaust plume gases can be delayed until the jet engine has moved further down range as compared with a conventional jet engine having a conventional plug body. This extends the transitional phase of the exhaust plume and provides an opportunity to isentropically turn the free stream to a direction parallel to a longitudinal axis of the jet engine, thereby eliminating any shock that might otherwise be provoked by such a change of direction of the free stream. In yet another embodiment, the plug body can further be configured to permit the trailing edge of the nozzle to have a reduced angle as compared with the angle of the trailing edge of a nozzle on a conventional jet engine.

As set forth above, both the inlet arrangement and the nozzle arrangement disclosed herein permit their respective cowl lip and nozzle trailing edge to have relatively shallow angles with respect to a free stream of air as compared with the cowl lip and nozzle trailing edge of a conventional inlet arrangement and nozzle arrangement. The shallowness of these angles substantially reduces the cross-sectional profile of the inlet arrangement and nozzle arrangement with respect to the free stream during supersonic flight. Consequently, the inlet arrangement and the nozzle arrangement of the present disclosure each greatly diminish the drag acting on a supersonic jet engine equipped with either or both the inlet arrangement and the nozzle arrangement disclosed herein.

A greater understanding of the solutions described above and of the method for implementing these solutions may be obtained through a review of the illustrations accompanying this application together with a review of the detailed description that follows.

Figure 4:
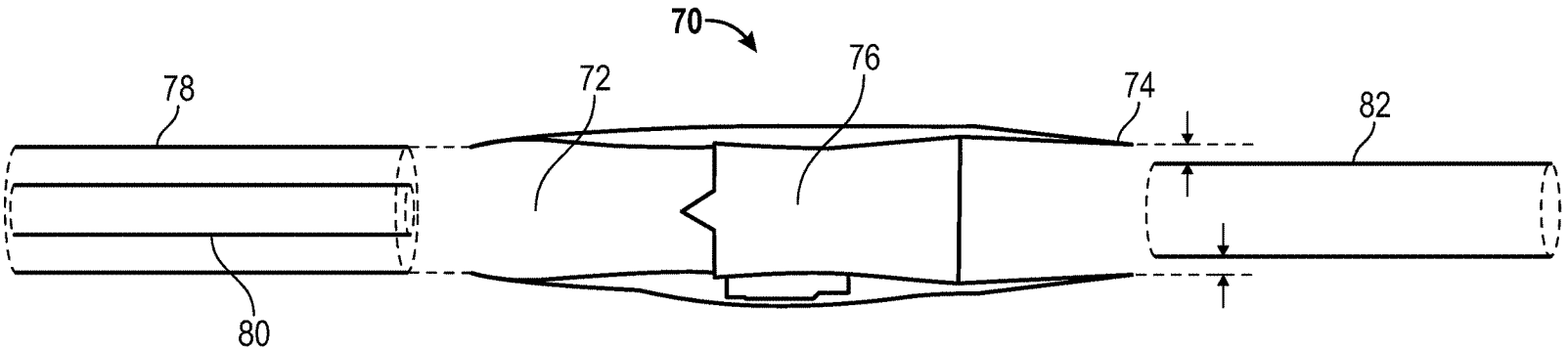
FIG. 4 is a schematic view illustrating a portion of a jet engine and depicting the air that the jet engine will consume and the fully expanded exhaust plume that the jet engine will produce.

FIG. 4 is a schematic view illustrating a generic supersonic jet engine 70 having an inlet 72 and a nozzle 74. For simplification, generic supersonic jet engine 70 has been drawn without a center body disposed in inlet 72 and without a plug body disposed in nozzle 74. Generic supersonic jet engine 70 includes turbo machinery 76 configured to consume air at a predetermined rate and to produce exhaust gases at a predetermined rate and pressure while turbo machinery 76 is operating at a predetermined power setting and moving at a predetermined speed.

A stream tube 78 is positioned ahead of generic supersonic jet engine 70. Stream tube 78 has a diameter that corresponds to the diameter of inlet 72 and represents the air in the free stream that lies on a path that will be taken by inlet 72 as generic supersonic jet engine 70 travels upstream. Accordingly, all of the air included in stream tube 78 will interact in some way with inlet 72. Some of that air will pass through inlet 72 while the remaining air will spill over the cowl lip of inlet 72 because turbo machinery 76 cannot consume it.

A remaining stream tube 80 is illustrated within stream tube 78. Remaining stream tube 80 represents the air within stream tube 78 that will be consumed by turbo machinery 76 of generic supersonic jet engine 70. All air within stream tube 78 other than remaining stream tube 80 will spill around the cowl lip of inlet 72 when stream tube 78 encounters inlet 72. One goal of the inlet arrangement of the present disclosure is to push all air other than the air contained within remaining stream tube 80 out of the path of inlet 72 before stream tube 78 encounters inlet 72.

An exhaust plume 82 is positioned downstream of generic supersonic jet engine 70. Exhaust plume 82 represents the volume of gases that will be exhausted by turbo machinery 76 when generic supersonic jet engine 70 is operated at a predetermined power setting and is moving at a predetermined speed. As illustrated, exhaust plume 82 has a diameter that is smaller than the diameter of the nozzle 74. However, when the exhaust gases exit nozzle 74, their outer periphery will have a diameter equal to the diameter of nozzle 74. After the exhaust gasses move downstream and are free of the influence of a plug body, their diameter will shrink until the exhaust gases are fully expanded and their static pressure has equalized with the static pressure of the free stream surrounding exhaust plume 82. One goal of the nozzle arrangement of the present disclosure is to ensure that the free stream air flowing past an external portion of nozzle 74 changes direction isentropically (i.e., without shocks) as it coalesces with a fully expanded exhaust plume 82.

Figure 5:
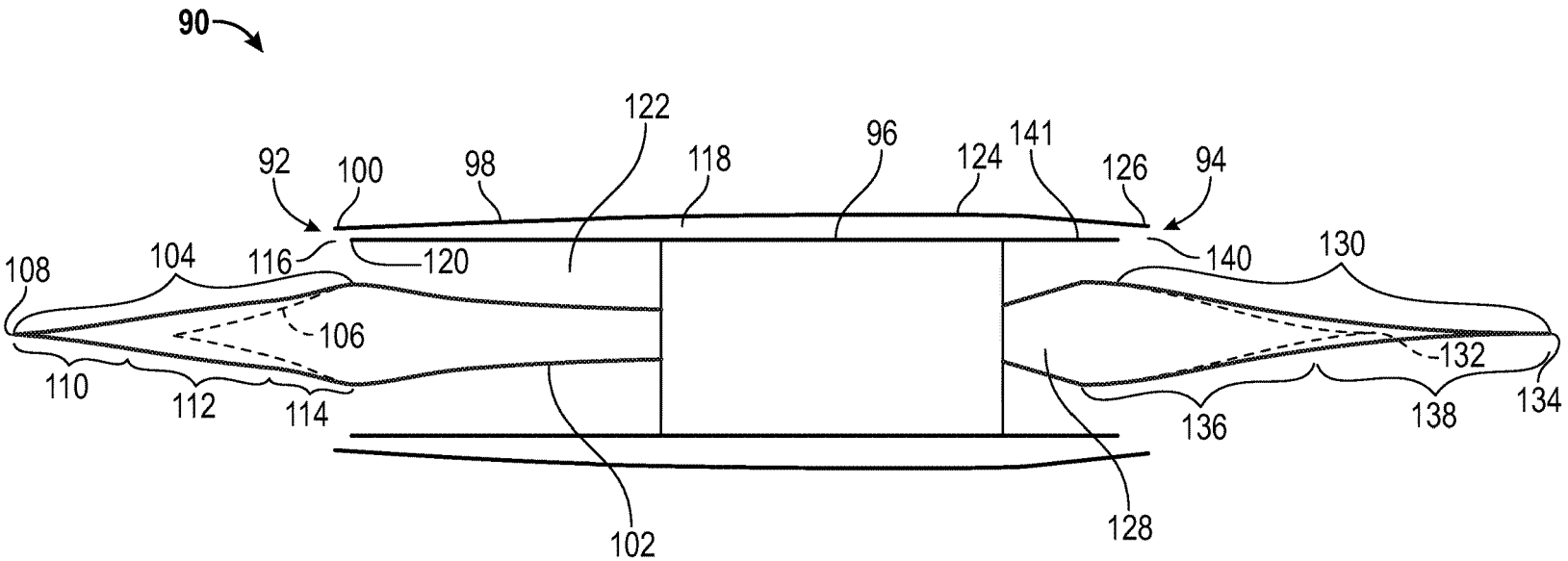
FIG. 5 is a schematic view illustrating an embodiment of a jet engine having an inlet arrangement and a nozzle arrangement made in accordance with the teachings of the present disclosure.

FIG. 5 is a schematic view illustrating a supersonic jet engine 90 including an inlet arrangement 92 and a nozzle arrangement 94 made in accordance with the teachings of the present disclosure. Supersonic jet engine 90 further includes turbo machinery 96 which is configured to consume air at a predetermined rate and to exhaust gases at a predetermined rate and pressure when supersonic jet engine 90 is moving at a predetermined speed and operating at a predetermined power setting. It should be understood that although inlet arrangement 92 is depicted as having an axisymmetric inlet configuration, in other embodiments, other configurations are possible.

Inlet arrangement 92 includes a cowl 98 having a cowl lip 100, and a center body 102 positioned at least partially within cowl 98 and coaxially aligned therewith. Center body 102 includes a protruding portion 104 having a length that exceeds a conventional spike length. For comparison purposes, a protruding portion 106 having a conventional spike length has been illustrated in phantom and overlaid on top of center body 102. The length of protruding portion 104 will correspond with the desired use and/or specifications for supersonic jet engine 90 and may be determined based on a number of factors including, but not limited to, the smoothness characteristics of the streamtube required to meet a desired sonic boom loudness metric, and the amount of on-design pre-shock spillage required to match and hold the inlet to low post-shock spillage at off-design conditions.

Center body 102 is an exemplary center body that is compatible with the teachings of the present disclosure and includes an apex 108, an initial compression surface 110, an expansion surface 112, and a final compression surface 114. In other embodiments, center body 102 may omit an intermediate expansion surface (expansion surface 112). Cowl lip 100 is spaced apart from final compression surface 114 to define an inlet 116 through which air may pass for consumption/use by turbo machinery 96. As illustrated, apex 108 is positioned well upstream of inlet 116 and consequently can have an impact on a stream tube approaching supersonic jet engine 90 well before that stream tube encounters inlet 116.

When a stream tube encounters apex 108, the air of the stream tube will be diverted in a direction radially outwardly from center body 102. As a result of this outward movement, a portion of the diverted air will be moved out of the pathway of inlet 116. Because protruding portion 104 has a diameter that increases in the downstream direction, as the stream tube continues to move towards inlet 116, an increasing amount of air will be diverted out of the pathway of inlet 116. Method of Characteristics may be used to determine the contour of center body 102. Method of Characteristics is well known in the art and uses classical gas dynamic relationships and equation marching methods for rapid preliminary analysis of promising supersonic shapes and bodies. Using Method Of Characteristics, the precise contour and dimensions of center body 102 and of protruding portion 104 can be selected such that the air of the stream tube that remains in the pathway of inlet 116 will substantially match the predetermined rate of air consumption by turbo machinery 96. As a result, substantially all of the remaining air that passes through the terminal shock will be consumed by turbo machinery 96 and substantially no spillover of air will occur at cowl lip 100. When using Method of Characteristics to generate an appropriate surface configuration, a desired surface curve is first selected for the captured streamtube that defines a continuously smooth, isentropic lofting of the streamtube surface into the intake's cowl lip. Method of characteristics is then used to design the curvature of the protruding surface 104 of the centerbody that produces the supersonic compression and expansion field that results in the desired streamtube shape (i.e. an 'inverse design' approach). Additional important parameters that method of characteristics uses in this instance include freestream Mach number, level of relaxed isentropic compression desired, and Mach number distribution along the terminal shock. Using this information, Method Of Characteristics could be used to generate an appropriate surface geometry for center body 102.

To ensure that the divergence of air by initial compression surface 110 does not generate a shock, in some embodiments, initial compression surface 110 may be configured to be an isentropic compression surface. As is known in the art, isentropic compression surfaces have a continuously curved shape that is devoid of any discrete discontinuities that would otherwise give rise to discrete shocks. Once the air of the stream tube has been diverted by initial compression surface 110, it may be desirable to turn the stream tube back in a direction more aligned with a longitudinal axis of supersonic jet engine 90. This is accomplished by expansion surface 112 which, due to its curvature, causes the stream tube to turn back in an axial direction. This allows cowl lip 100 to have a very shallow angle with respect to the local free stream which, in turn, substantially reduces the strength of the cowl shock generated by cowl lip 100.

Final compression surface 114 serves the same purpose served by conventional compression surfaces of conventional supersonic jet engines, i.e., reducing the speed of the oncoming stream tube before the stream tube encounters the terminal shock and before the stream tube enters the inlet. As known in the art, a supersonic airflow can be slowed using a curved surface to turn the direction of the airflow. Again, it is desirable to avoid generating any shocks during this final compression stage. Accordingly, in some embodiments, an isentropic compression surface may be used. In other embodiments, it may be desirable to configure final compression surface 114 to have a relaxed isentropic compression configuration. A relaxed isentropic compression surface is known in the art and is disclosed and described in pending U.S. patent application Ser. Nos. 11/639,339; 13/338,005; and 13/338,010, each of which is hereby incorporated herein by reference in their entirety. By configuring final compression surface 114 to have a relaxed isentropic compression configuration, the airflow approaching inlet 116 will undergo a reduced amount of turning from the axial direction of supersonic jet engine 90 as compared with the amount of turning caused by a traditional isentropic compression surface. This contributes to cowl lip 100 having a relatively small angle with respect to the axial direction of supersonic jet engine 90, and thus contributes to a reduction in the strength of any resulting cowl shock.

Supersonic jet engine 90 further includes a bypass 118. Bypass 118 is an alternate flow pathway through supersonic jet engine 90 that is commonly used to route turbulent air having relatively high pressure distortions around and past turbo machinery 96 rather than permitting such turbulent air to pass through turbo machinery 96. A bypass, such as bypass 118, further contributes to cowl lip 100 having a relatively shallow angle with respect to a longitudinal axis of supersonic jet engine 90. This, in turn, further reduces the strength of the cowl shock formed by cowl lip 100. The use of the bypass in a supersonic jet engine is known in the art. For example, a bypass is disclosed and described in U.S. Provisional Patent Application 60/960,986 and also in U.S. patent application Ser. No. 12/000,066, each of which are hereby Incorporated herein by reference in their entirety.

Inlet arrangement 92 includes a bypass splitter 120. Bypass splitter 120 is a physical structure which divides (splits) the air entering inlet 116, causing a portion of the air to travel along bypass 118 and causing another portion of the air to follow a path 122 that leads to turbo machinery 96. Turbo machinery 96 will pass through multiple power settings as the aircraft accelerates to the pre-determined Mach speed. At each power setting, turbo machinery 96 will consume air at a corresponding mass flow rate which will differ from the predetermined mass flow rate at the predetermined Mach speed. As set forth above, center body 102 and protruding portion 104 are configured to pre-spill an amount of air that will cause the amount of air entering inlet 116 to substantially match the mass flow rate at the predetermined Mach speed and the predetermined power setting. To the extent that there is any mismatch between the air entering inlet 116 and the air that will be consumed by turbo machinery 96 when operating at the predetermined power setting and moving at the predetermined Mach speed and to the extent that such mismatch leads to spillage, that spillage will occur over bypass splitter 120, not cowl lip 100. Spillage over bypass splitter 120 will not impact the strength of the cowl shock. For other Mach speeds and for other power settings, the rate of air entering inlet 116 may not match the rate at which turbo machinery 96 consumes air. For those Mach speeds and power settings, the excess air that enters inlet 116 will spill over bypass splitter 120 and into bypass 118. In this manner, bypass 118 serves as an overflow pathway for air that cannot be consumed by turbo machinery 96.

Nozzle arrangement 94 includes a nozzle 124 having a trailing edge 126, and a plug body 128 that is positioned at least partially within the nozzle 124 and coaxially aligned therewith. Plug body 128 includes a protruding portion 130 having a length that exceeds a conventional plug body length. For comparison purposes, a protruding portion 132 having a conventional plug body length has been illustrated in phantom and overlaid on top of plug body 128. The length of protruding portion 130 will correspond with the desired use and/or specifications for supersonic jet engine 90 and may be determined based on a number of factors including, but not limited to, the smoothness characteristic of the streamtube required to meet a desired sonic boom loudness metric, the jet exit pressure and Mach number, and the maximum practical length from a design standpoint.

Plug body 128 includes a trailing end 134, an expansion surface 136 and a compression surface 138. *As illustrated in the embodiment presented in FIG. 5, compression surface 138 has a concave configuration. See also, FIGS. 8 and 10.* Expansion surface 136 is spaced apart from trailing edge 126 to define an outlet 140 through which exhaust gases pass and are formed into an exhaust plume. The exhaust gases are produced by turbo machinery 96 at a predetermined mass flow rate when turbo machinery 96 is operated at a predetermined power setting. Consequently, the size and shape of outlet 140 can be configured to obtain a desired amount of thrust.

The exhaust plume expelled from nozzle 124 will have a predetermined static pressure that corresponds with the exit area of outlet 140 and that further corresponds with the mass flow rate of the exhaust gases flowing out of turbo machinery 96 when turbo machinery 96 is operating at the predetermined power setting and when supersonic jet engine 90 is moving at the predetermined Mach speed. Trailing edge 126 has a smaller angle with respect to an axial direction of supersonic jet engine 90 as compared with a traditional nozzle on a conventional supersonic jet engine. The smaller trailing edge angle gives rise to less drag as the free stream flows over an outer surface of the nozzle 124 and causes the free stream to have a shallower angle as it flows past trailing edge 126.

The presence of bypass 118 contributes to nozzle 124 having a very shallow angle with respect to an axial direction of supersonic jet engine 90. To accommodate the presence of bypass 118, nozzle arrangement 94 includes bypass wall 141. Air flowing through bypass 118 will flow past bypass wall 141 and will join together with the exhaust gases expelled by turbo machinery 96 to form the exhaust plume. Despite the illustration in FIG. 5 of an embodiment of a supersonic jet engine that includes a bypass, it should be understood that the teachings disclosed herein are compatible with supersonic jet engines that do not include a bypass.

As will be discussed below, nozzle 124 has an annular configuration. Consequently, the exhaust plume emitted from nozzle 124 also has an annular configuration. Nozzle arrangement 94 enables the exhaust plume to remain in an annular configuration for a longer distance than a conventional nozzle arrangement would because protruding portion 130 has a length that exceeds a conventional plug body length. Accordingly, plug body 128 is configured to enable the exhaust plume to remain in an annular configuration (albeit a shrinking annular configuration) as it moves in a downstream direction rather than immediately collapsing down to the fully expanded exhaust plume depicted in FIG. 4. By extending the distance over which the exhaust plume remains in an annular configuration, the distance over which the free stream turns to align with a longitudinal axis of supersonic jet engine 90 is extended. This helps to prevent a shock from forming.

By providing a plug body 128 with a protruding portion 130 that exceeds a conventional plug body length, the shape and contour of the annular exhaust plume can be controlled well after it has been expelled from nozzle 124 and it can be conformed to flow tangentially with the free stream moving past trailing edge 126. By configuring plug body 128 to have a surface geometry that causes the exhaust plume to have a static pressure that is substantially equal to the static pressure of the free stream flowing past trailing edge 126, plug body 128 can control the rate at which the free stream turns towards an axial direction of supersonic jet engine 90. As will be discussed below, the contour and configuration of plug body 128 and protruding portion 130 can be determined using Method of Characteristics.

Figure 6:
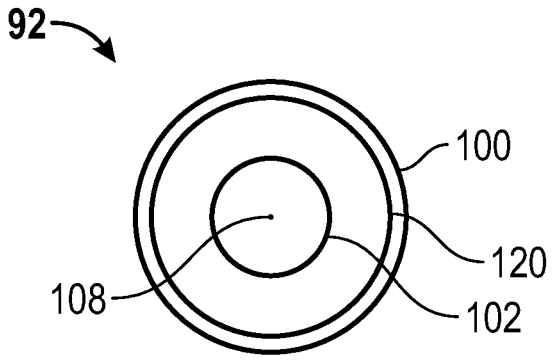
FIG. 6 is an axial view of the inlet arrangement of FIG. 5.

FIG. 6 illustrates an axial view of inlet arrangement 92 in accordance with one embodiment. As illustrated, inlet arrangement 92 has an axisymmetric configuration. Apex 108 is positioned on a longitudinal axis of supersonic jet engine 90. Center body 102 is coaxially aligned on the same longitudinal axis and with bypass splitter 120 which, in turn, is coaxially aligned with the cowl lip 100. In other embodiments, inlet arrangement 92 need not be axisymmetric but may have other configurations.

Figure 7:
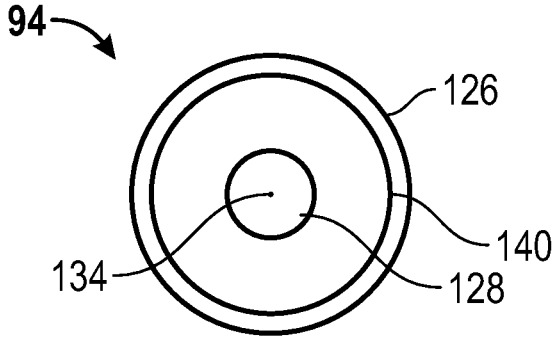
FIG. 7 is an axial view of the nozzle arrangement of FIG. 5.

FIG. 7 illustrates an axial view of the nozzle arrangement 94 in accordance with one embodiment. As illustrated, nozzle arrangement 94 has an axisymmetric configuration. Trailing end 134 is positioned on a longitudinal axis of supersonic jet engine 90. Plug body 128 is coaxially aligned with bypass wall 141 which, in turn, is coaxially aligned with trailing edge 126.

Figure 8:
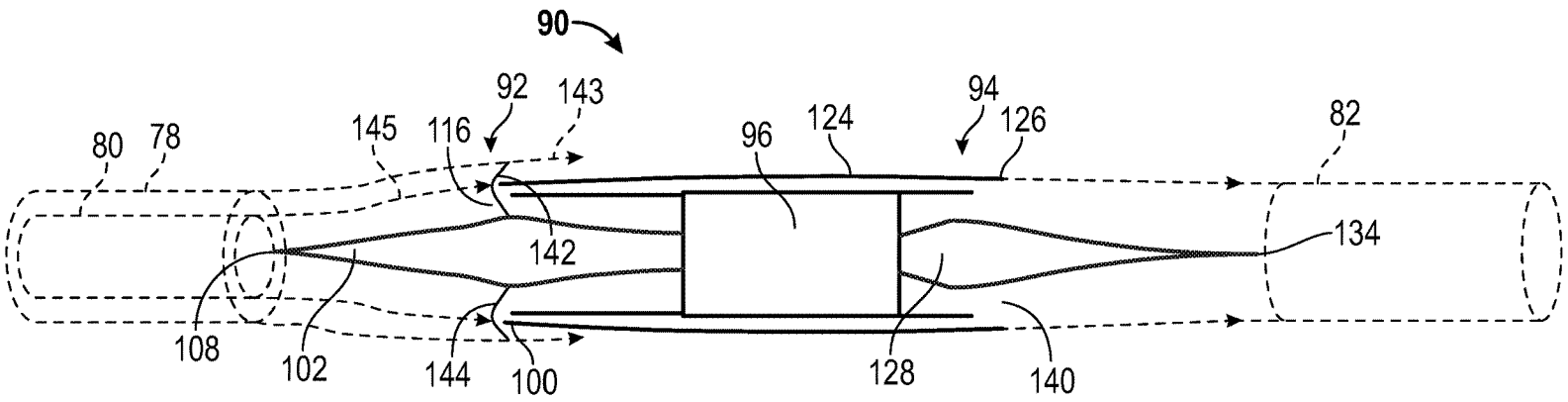
FIG. 8 is a schematic view of the jet engine of FIG. 5 traveling through a free stream at a predetermined Mach speed.

FIG. 8 is a schematic view illustrating supersonic jet engine 90 while traveling at the predetermined Mach speed and while turbo machinery 96 is operating at the predetermined power setting. A cowl shock 142 and a terminal shock 144 are illustrated propagating outwardly and inwardly, respectively, from cowl lip 100. Stream tube 78 is positioned upstream of supersonic jet engine 90 and has a diameter equal to the diameter of inlet 116. Remaining stream tube 80 is illustrated within stream tube 78 and represents the volume of air that will be consumed by turbo machinery 96.

When stream tube 78 encounters apex 108, the air of stream tube 78 begins to divert in a radially outward direction. This movement will push a portion of the air of stream tube 78 out of the path of inlet 116. As stream tube 78 continues to move towards inlet 116, the air of stream tube 78 is continuously pushed in a radially outward direction by the surface of center body 102 which has an increasing diameter in the downstream direction. The movement of the excess air of stream tube 78 out of the path of inlet 116 is depicted by arrow 143. The radial expansion of the outer diameter of remaining stream tube 80 is depicted by arrow 145. By the time that remaining stream tube 80 travels from the position initially shown in FIG. 8 to a position immediately upstream of inlet 116, the outer diameter of remaining stream tube 80 has expanded such that it is equal to the diameter of inlet 116.

Because of the contour and dimensions of center body 102 and, in particular, the contour and dimensions of protruding portion 104 (see FIG. 5), the volume of air of remaining stream tube 80 is substantially equal to the rate at which turbo machinery 96 consumes air over a predetermined period of time. As a result, substantially all of the air of remaining stream tube 80 will enter inlet 116 and will be consumed by turbo machinery 96 after passing through terminal shock 144. This enables terminal shock 144 to remain attached to cowl lip 100. Furthermore, center body 102 is configured to control and direct the flow of air of remaining stream tube 80 such that the flow of air enters inlet 116 at a very shallow angle as compared with the angle at which the flow of air enters a conventional supersonic jet engine. This allows cowl lip 100 to have a relatively shallow angle and, consequently, a relatively weak cowl shock.

At nozzle 124, exhaust gases are expelled from outlet 140 at a predetermined mass flow rate and static pressure that is determined, in part, by the area and shape of outlet 140 and also by the rate and pressure at which turbo machinery 96 expels gas. As the exhaust gases move past trailing edge 126, they are no longer constrained by the walls of the nozzle 124. Accordingly, the natural tendency of the exhaust gases would be to expand outwardly in a direction transverse to the downstream direction as they move in the downstream direction. Movement of the exhaust gases in the direction transverse to the downstream direction is opposed by the static pressure of the free stream flowing past trailing edge 126. Similarly, movement of the free stream moving past trailing edge 126 in the direction transverse to the downstream direction is opposed by the static pressure of the exhaust gases. Consequently, at the point where the free stream and the exhaust gases move past trailing edge 126, they will encounter and oppose one another. If one flow has a greater static pressure than the other, then both flows will turn towards the flow having the weaker static pressure.

Nozzle arrangement 94 is configured such that the exhaust gases will have a static pressure that matches the local free stream at the nozzle exit. Because of this and because of the contour and configuration of plug body 128, the two flows will not turn in the direction of the free stream. At outlet 140, plug body 128 has a contour that presents an expansion surface (expansion surface 136, see FIG. 5) to the exhaust gases, allowing the exhaust gases to expand in a direction away from the free stream. By selecting a particular contour and configuration for plug body 128 and protruding portion 130 (see FIG. 5), the exhaust gases can be allowed to expand radially inwardly at a rate that allows their outer periphery to provide an appropriate amount of static pressure to the free stream such that the free stream and the exhaust gases will flow tangentially to one another at their shear surface without either flow experiencing an immediate change in direction.

As the exhaust gases continue to move in a downstream direction away from outlet 140, they continue to expand in a radially inward direction and are permitted to do so by the diminishing diameter of protruding portion 130 (see FIG. 5). At some point along the surface of plug body 128, the exhaust gases will move off of expansion surface 136 (see FIG. 5) and onto compression surface 138 (see FIG. 5). Now faced with a compression surface, the exhaust gases will have a diminished ability to expand in a radially inward direction and, consequently, the exhaust gases will begin to return to an axially aligned flow. By giving protruding portion 130 (see FIG. 5) an appropriate contour and configuration, protruding portion 130 will cause the exhaust gases to have a static pressure at their periphery during their outward expansion that causes the free stream to turn isentropically.

Eventually, the exhaust gases will move past trailing end 134, at which point plug body 128 will have no further influence on the expansion of the exhaust gases. Shortly thereafter, the exhaust gases will reach a fully expanded state wherein the static pressure of the exhaust gas will be equal to the static pressure of the free stream. From this point on, the exhaust gasses (exhaust plume 82) and the free stream will flow parallel to one another in the downstream direction.

The effect that plug body 128 has on the free stream can be summarized as follows. The free stream is turned from a direction that is tangential to the outer walls of trailing edge 126 to a direction that is parallel to the longitudinal axis of supersonic jet engine 90. During this transitional phase, the free stream is turned as a result of the static pressure exerted by the exhaust gases. The contour of plug body 128 controls the static pressure of the exhaust gases. Thus, by selecting an appropriate contour and configuration for plug body 128, the free stream can be turned isentropically without shock.

Figure 9:
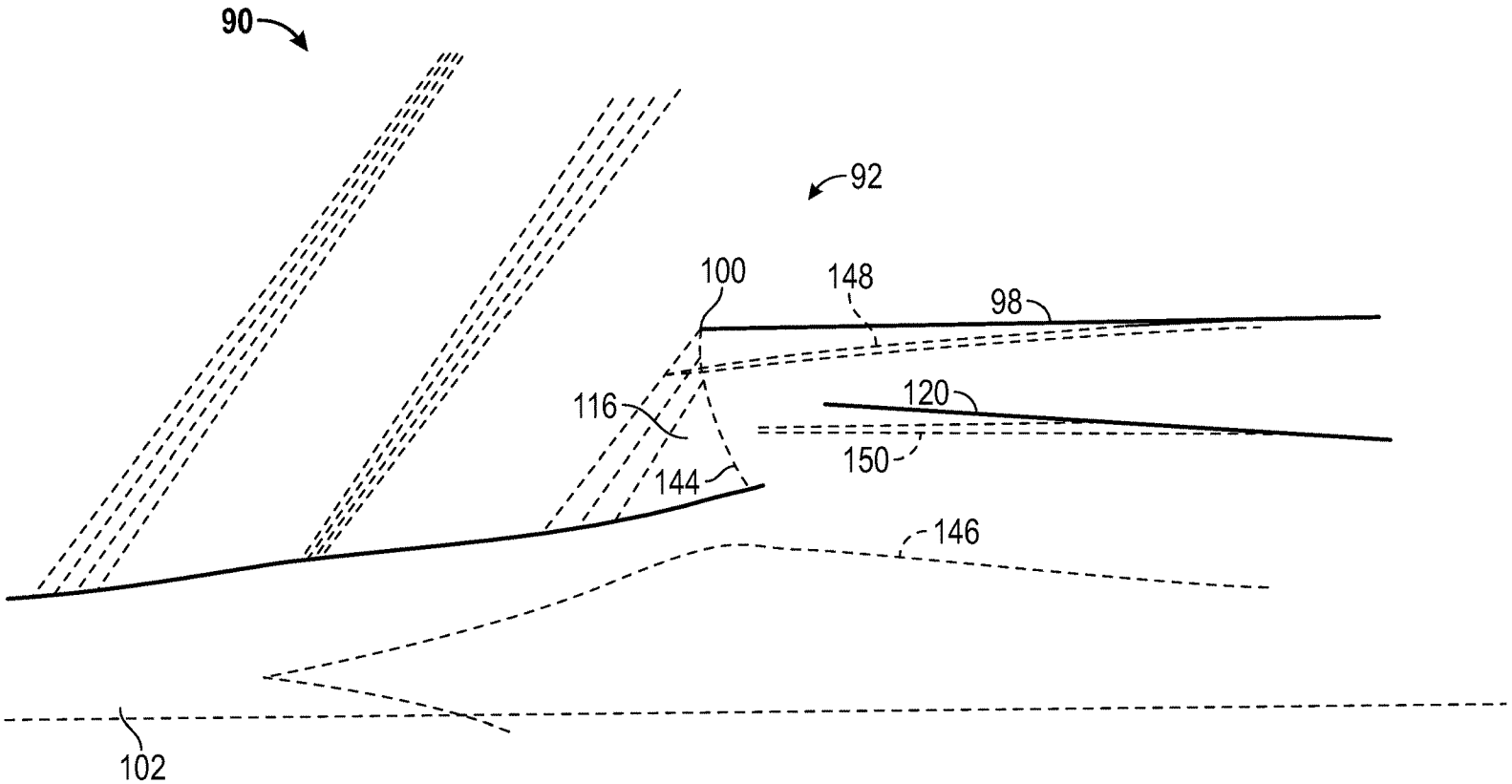
FIG. 9 is an expanded view of a portion of the inlet arrangement of FIG. 5.

FIG. 9 illustrates a portion of an inlet arrangement 92 in an expanded view. This view compares a conventional supersonic jet engine having a conventional center body 146 (shown in phantom) with a supersonic jet engine 90 equipped with center body 102. The conventional supersonic jet engine has a conventional cowl 148 and a conventional bypass splitter 150 while supersonic jet engine 90 has cowl 98 and a bypass splitter 120. As can be seen, cowl 98 has a much shallower angle than conventional cowl 148 with respect to a free stream direction. This reduction in cowl angle is made possible by center body 102 which, as set forth above, has a protruding portion that has a length that exceeds a conventional spike length. The additional length of center body 102 provides center body 102 with an opportunity to turn the direction of the free stream flowing over center body 102 in a direction that is more axially aligned with a longitudinal axis of supersonic jet engine 90. The angle of bypass splitter 120 has also been changed to accommodate the oncoming flow of air entering inlet 116 across terminal shock 144 which has a more longitudinal flow direction. By permitting such a sharp reduction in the cowl angle, center body 102 contributes to a substantial reduction in the strength of the cowl shock produced by cowl lip 100.

Figure 10:
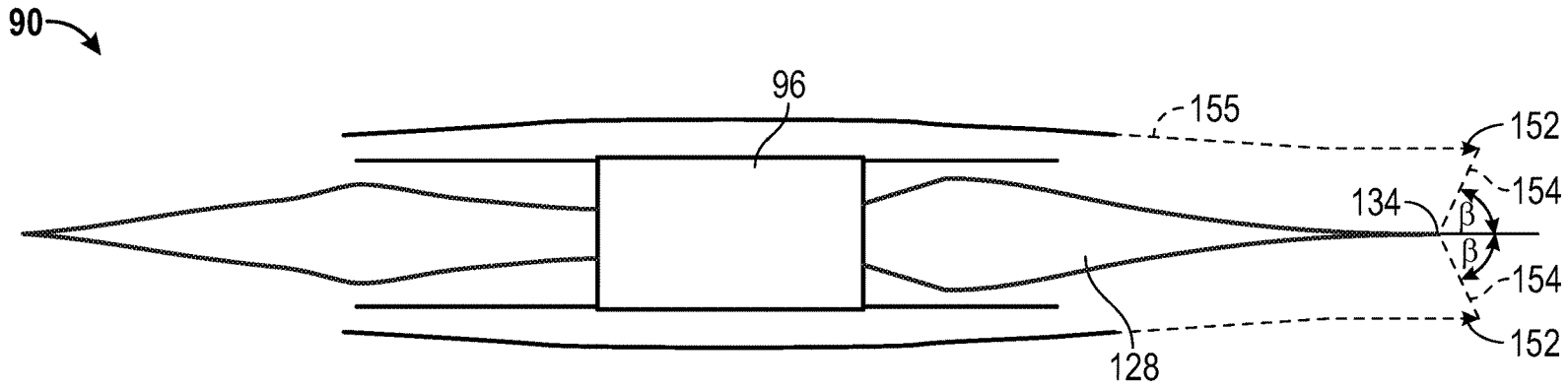
FIG. 10 is a schematic view of the jet engine of FIG. 5 illustrating a technique for designing the plug body of the nozzle arrangement.

FIG. 10 provides a visual depiction of a technique for designing plug body 128. Depending upon the anticipated use of supersonic jet engine 90, a designer will select a downstream location where it is desirable for the exhaust gases to reach a fully expanded state and begin to flow parallel to the direction of the free stream. In FIG. 10, this location is identified by arrow heads 152. Arrowheads 152 are spaced apart by a distance equal to the diameter of exhaust plume 82 (see FIG. 8) which corresponds with the known output of turbo machinery 96. Although the location of arrowheads 152 in the longitudinal direction may vary based on design criteria, their distance from one another in the lateral direction is fixed based on the power setting of turbo machinery 96.

Once the designer has selected the location for arrowheads 152, the next step is to determine the location for trailing end 134 of plug body 128. The location of trailing end 134 is determined based on the well-known principle of Mach line propagation. Mach lines will propagate off of a surface in a supersonic flow at an angle β which is determined by the following equation:

$$\beta = \text{arcsine}(1/\text{Mach number})$$

Accordingly, for a known Mach speed of the exhaust gases traveling past trailing end 134, a Mach line 154 will propagate off of trailing end 134 at angle β. Using both angle β and the location of the arrow heads, the location of trailing end 134 can be determined by positioning an end of each Mach line 154 on each arrowhead 152 and, looking in an upstream direction, determining where the Mach lines intersect. That point of intersection is the location where trailing end 134 will be located. Once the location of trailing end 134 is determined, the overall length of body plug 128 can be determined.

Next, a desired curvature is selected for the turning of the free stream. This curvature is represented by phantom line 155 and is selected by the nozzle designer. One criteria may be to choose a curvature that will result in an isentropic change in direction of the free stream. Once the desired curvature is selected, the contours and configuration of plug body 128 can be determined using Method of Characteristics. When utilizing Methods of Characteristics, phantom line 155 is considered to be a boundary condition and the contours and configuration of plug body 128 is calculated by selecting a curvature for plug body 128 that will cause the exhaust gases to conform to phantom line 155. Other techniques such as the use of computational fluid dynamics software may also be utilized when determining the geometry of plug body 128.

Figure 11:
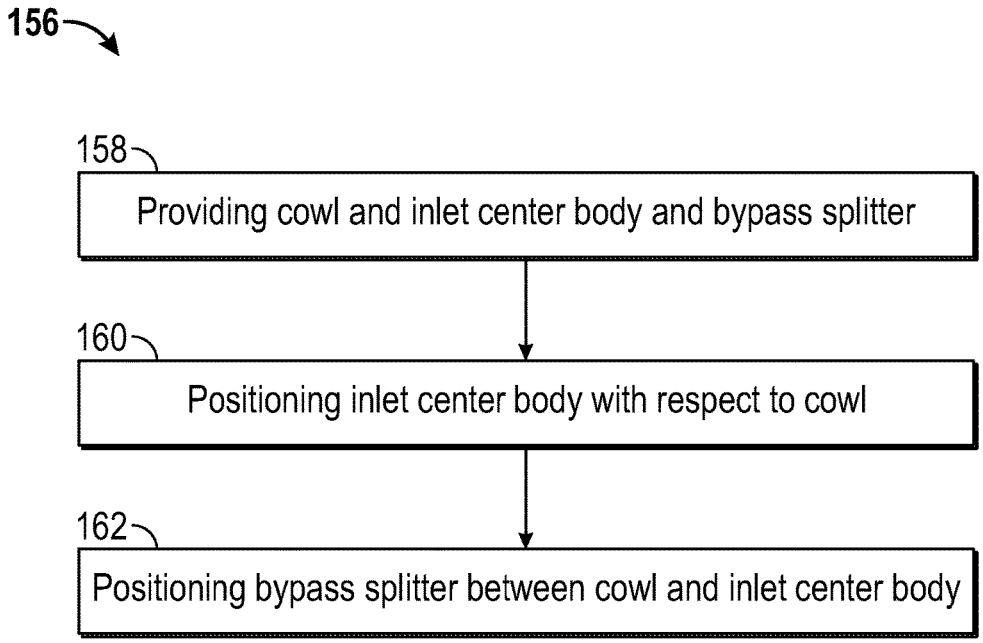
FIG. 11 is a flow diagram illustrating an embodiment of a method for making an inlet arrangement in accordance with the teachings of the present disclosure.

FIG. 11 is a flow diagram illustrating a method 156 for making an inlet arrangement for use with a supersonic jet engine that is configured to consume air at a predetermined mass flow rate when the supersonic jet engine is operating at a predetermined power setting and moving at a predetermined Mach speed.

At step 158, a cowl, a center body and a bypass splitter are provided. In some embodiments, the supersonic engine may not include a bypass. For such embodiments, this step would not include providing a bypass splitter. The cowl has a cowl lip. The center body has an apex, a first compression surface located downstream of the apex, and a second compression surface located downstream of the first compression surface.

At step 160, the center body is positioned with respect to the cowl such that the center body is coaxial with the cowl, a protruding portion of the center body extends upstream of the cowl lip for a length that is greater than a conventional spike length, and the second compression surface is spaced apart from the cowl lip such that the second compression surface and the cowl lip define an inlet.

At step 162, for supersonic engines that are configured with a bypass splitter, the bypass splitter is positioned between the cowl and the center body to form a bypass that is configured to receive air at a second predetermined mass flow rate when the supersonic jet engine is operating at the predetermined power setting and moving at the predetermined Mach speed.

When properly implemented, method steps 158-162 will yield an inlet arrangement where the protruding portion of the center body is configured to divert a flow of air that is located in a path of the inlet out of the path of the inlet such that a remaining flow of air that approaches and enters the inlet is not greater than the predetermined mass flow rate when the jet engine is operating at the predetermined power setting and moving at the predetermined Mach speed. For embodiments of the supersonic jet engine that include the bypass, the center body is configured to divert the flow of air that is located in the path of the inlet out of the path of the inlet such that the remaining flow of air approaching and entering the inlet is not greater than the first predetermined mass flow rate (i.e., the predetermined rate at which air is consumed by the turbo machinery of the supersonic jet engine) and the second predetermined mass flow rate (i.e., the rate at which the by-pass routes airflow around the turbo machinery) combined when the jet engine is operating at the predetermined power setting and moving at the predetermined Mach speed.

Figure 12:
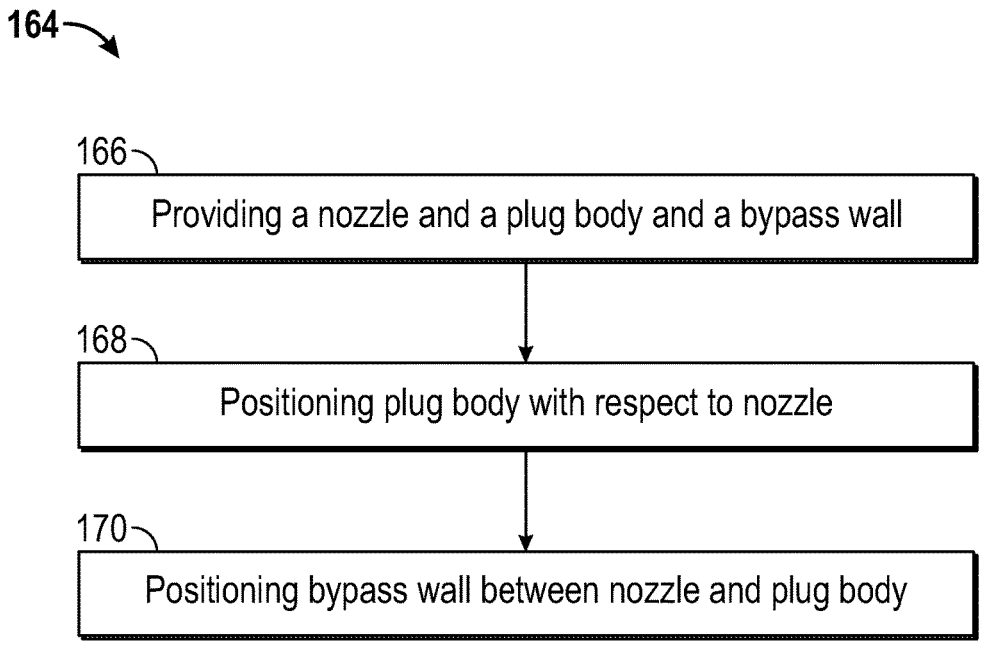
FIG. 12 is a flow diagram illustrating an embodiment of a method for making a nozzle arrangement in accordance with the teachings of the present disclosure.

FIG. 12 is a flow diagram illustrating a method 164 for making a nozzle arrangement for use with a supersonic jet engine that is configured to produce a plume of exhaust gases when the engine is operating at a predetermined power setting and moving at a predetermined Mach speed.

At step 166 a nozzle, a plug body, and a bypass wall are provided. In some embodiments, a bypass will not be utilized. For such embodiments, a bypass wall will not be provided. The nozzle is configured to exhaust the plume of exhaust gases and has a trailing edge oriented at a predetermined angle with respect to an axial direction of the nozzle. The plug body has an expansion surface and a compression surface downstream of the expansion surface.

At step 168, the plug body is positioned with respect to the nozzle such that the plug body is partially positioned within the nozzle and coaxially aligned therewith and such that a protruding portion of the plug body extends downstream of the trailing edge for a length greater than a conventional plug body length.

At step 170, for embodiments that utilize a bypass, the bypass wall will be positioned between the nozzle and the plug body.

When properly implemented, method steps 166-170 will yield a nozzle arrangement wherein the protruding portion of the plug body will have a substantially circular cross-section along substantially an entire longitudinal length of the protruding portion of the plug body. The plug body will be configured to shape the plume of exhaust gases such that the plume of exhaust gases flows substantially parallel to a direction of the free stream of air flowing off of the trailing edge of the nozzle proximate the trailing edge of the nozzle and wherein the plug body is further configured to cause the plume of exhaust gases to isentropically turn the free stream of air flowing off of the trailing edge of the nozzle at a location downstream of the trailing edge of the nozzle such that the free stream of air flowing off of the trailing edge moves in a direction parallel to a longitudinal axis of the plug body. In embodiments that utilize a bypass, the plug body will be configured to cause the plume of exhaust gases and a bypass airflow to isentropically turn the free stream of air flowing off of the trailing edge of the nozzle to the direction parallel to the longitudinal axis of the plug body at a location downstream of a trailing end of the plug body.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A nozzle arrangement for use with a supersonic jet engine configured to produce a plume of exhaust gases when the supersonic jet engine is operating at a predetermined power setting and moving at a predetermined Mach speed, the nozzle arrangement comprising:

a nozzle configured to exhaust the plume of exhaust gases, the nozzle having a trailing edge; and a plug body partially positioned within the nozzle [and coaxially aligned with the nozzle], the plug body having an expansion surface and a compression surface downstream of the expansion surface, a protruding portion of the plug body extending downstream of the trailing edge, the protruding portion of the plug body having a concave surface proximate a terminus of the plug body, the plug body having contours and dimensions configured to shape the plume of exhaust gases such that the plume of exhaust gases flows substantially parallel to a direction of a free stream of air flowing off of the trailing edge of the nozzle proximate the trailing edge of the nozzle when the supersonic jet engine is operating at the predetermined power setting and moving at the predetermined Mach speed and has further contours and dimensions that are configured to cause the plume of exhaust gases to isentropically turn the free stream of air flowing off of the trailing edge of the nozzle at a location downstream of the trailing edge of the nozzle such that the free stream of air flowing off of the trailing edge moves in a direction parallel to a longitudinal axis of the plug body when the supersonic jet engine is operating at the predetermined power setting and moving at the predetermined Mach speed.

2. The nozzle arrangement of claim 1, wherein the compression surface comprises an isentropic compression surface.

3. The nozzle arrangement of claim 1, wherein a portion of the expansion surface is upstream of the trailing edge of the nozzle.

4. The nozzle arrangement of claim 1, wherein the plug body is configured to cause the plume of exhaust gases to isentropically turn the free stream of air flowing off of the trailing edge of the nozzle to the direction parallel to the longitudinal axis of the plug body at a location downstream of a trailing edge of the plug body.

5. The nozzle arrangement of claim 1, wherein the trailing edge of the nozzle is substantially axisymmetric and wherein the trailing edge of the nozzle and the expansion surface of the plug body define an annular outlet of the nozzle.

6. The nozzle arrangement of claim 1, wherein the expansion surface and the compression surface are contiguous with one another.

7. The nozzle arrangement of claim 6, wherein a surface of the plug body is devoid of discrete discontinuities in a region where the expansion surface transitions into the compression surface.

8. A nozzle arrangement for use with a supersonic jet engine configured to produce a plume of exhaust gases when the supersonic jet engine is operating at a predetermined power setting and moving at a predetermined Mach speed, the nozzle arrangement comprising:

a nozzle configured to exhaust the plume of exhaust gases, the nozzle having a trailing edge;

a plug body partially positioned within the nozzle [and coaxially aligned with the nozzle]; and a bypass wall disposed between the nozzle and the plug body configured to direct a bypass airflow out of the nozzle, the plug body having an expansion surface and a compression surface downstream of the expansion surface, a protruding portion of the plug body extending downstream of the trailing edge, the protruding portion of the plug body having a concave surface proximate a terminus of the plug body, the plug body having contours and dimensions configured to shape the plume of exhaust gases and the bypass airflow such that the plume of exhaust gases and the bypass airflow flow substantially parallel to a direction of a free stream of air flowing off of the trailing edge of the nozzle proximate the trailing edge of the nozzle when the supersonic jet engine is operating at the predetermined power setting and moving at the predetermined Mach speed and has further contours and dimensions that are configured to cause the plume of exhaust gases and the bypass airflow to isentropically turn the free stream of air flowing off of the trailing edge of the nozzle at a location downstream of the trailing edge of the nozzle such that the free stream of air flowing off of the trailing edge moves in a direction parallel to a longitudinal axis of the plug body when the supersonic jet engine is operating at the predetermined power setting and moving at the predetermined Mach speed.

9. The nozzle arrangement of claim 8, wherein the compression surface comprises an isentropic compression surface.

10. The nozzle arrangement of claim 8, wherein a portion of the expansion surface is upstream of the trailing edge of the nozzle.

11. The nozzle arrangement of claim 8, wherein the plug body is configured to cause the plume of exhaust gases and the bypass airflow to isentropically turn the free stream of air flowing off of the trailing edge of the nozzle to the direction parallel to the longitudinal axis of the plug body at a location downstream of a trailing edge of the plug body.

12. The nozzle arrangement of claim 8, wherein the trailing edge of the nozzle is substantially axisymmetric and wherein the trailing edge of the nozzle and the expansion surface of the plug body define an annular outlet of the nozzle.

13. The nozzle arrangement of claim 8, wherein the expansion surface and the compression surface are contiguous with one another.

14. The nozzle arrangement of claim 13, wherein a surface of the plug body is devoid of discrete discontinuities in a region where the expansion surface transitions into the compression surface.

15. A method of making a nozzle arrangement for use with a supersonic jet engine configured to produce a plume of exhaust gases when the supersonic jet engine is operating at a predetermined power setting and moving at a predetermined Mach speed, the [nozzle arrangement] *method* comprising:

providing a nozzle configured to exhaust the plume of exhaust gases, the nozzle having a trailing edge, and a plug body having an expansion surface and a compression surface downstream the expansion surface;

positioning the plug body with respect to the nozzle such that the plug body is partially positioned within the nozzle [and coaxially aligned therewith and] such that a protruding portion of the plug body extends downstream of the trailing edge, wherein the protruding portion of the plug body has a concave surface proximate a terminus of the plug body, wherein the plug body has contours and dimensions configured to shape the plume of exhaust gases such that the plume of exhaust gases flows substantially parallel to a direction of a free stream of air flowing off of the trailing edge of the nozzle proximate the trailing edge of the nozzle when the supersonic jet engine is operating at the predetermined power setting and moving at the predetermined Mach speed, and wherein the plug body has further contours and dimensions that are configured to cause the plume of exhaust gases to isentropically turn the free stream of air flowing off of the trailing edge of the nozzle at a location downstream of the trailing edge of the nozzle such that the free stream of air flowing off of the trailing edge moves in a direction parallel to a longitudinal axis of the plug body when the supersonic jet engine is operating at the predetermined power setting and moving at the predetermined Mach speed.

16. The method of claim 15, wherein providing the plug body having *an expansion surface and a* compression surface *downstream of the expansion surface* comprises providing *a* plug body wherein the compression surface is an isentropic compression surface.

17. The method of claim 15, wherein providing the plug body having *an* expansion surface and [the] *a* compression surface *downstream of the expansion surface* comprises providing *a* plug body wherein the expansion surface is contiguous with *the* compression surface.

18. The method of claim 17, wherein providing the plug body [having] *wherein the* expansion surface [that] is contiguous with the compression surface comprises providing *a* plug body [wherein the plug body lacks] *lacking* any discrete discontinuities between the expansion surface and the compression surface.

19. A method of making a nozzle arrangement for use with a supersonic jet engine configured to produce a plume of exhaust gases when the supersonic jet engine is operating at a predetermined power setting and moving at a predetermined Mach speed, the [nozzle arrangement] *method* comprising:

providing a nozzle configured to exhaust the plume of exhaust gases, the nozzle having a trailing edge, and a plug body having an expansion surface and a compression surface downstream the expansion surface;

positioning the plug body with respect to the nozzle such that the plug body is partially positioned within the nozzle [and coaxially aligned therewith and] such that a protruding portion of the plug body extends downstream of the trailing edge;

providing a bypass wall and positioning the bypass wall between the nozzle and the plug body, wherein the protruding portion of the plug body has a concave surface proximate a terminus of the plug body, wherein the plug body has contours and dimensions configured to shape the plume of exhaust gases and a bypass flow such that the plume of exhaust gases and the bypass flow both flow substantially parallel to a direction of a free stream of air flowing off of the trailing edge of the nozzle proximate the trailing edge of the nozzle when the supersonic jet engine is operating at the predetermined power setting and moving at the predetermined Mach speed, and wherein the plug body has further contours and dimensions that are configured to cause the plume of exhaust gases and the bypass flow to isentropically turn the free stream of air flowing off of the trailing edge of the nozzle at a location downstream of the trailing edge of the nozzle such that the free stream of air flowing off of the trailing edge moves in a direction parallel to a longitudinal axis of the plug body when the supersonic jet engine is operating at the predetermined power setting and moving at the predetermined Mach speed.

* * * * *